(12) United States Patent
Yang et al.

(10) Patent No.: US 9,679,213 B2
(45) Date of Patent: Jun. 13, 2017

(54) IMAGE PROCESSING APPARATUS AND IMAGE PROCESSING METHOD (71) Applicant: Novatek Microelectronics Corp., Hsinchu (TW)

(72) Inventors: Mei-Juan Yang, ShaanXi Province (CN); Jian-Hua Liang, ShaanXi Province (CN); Yuan-Jia Du, Shandong Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 22 days.

(21) Appl. No.: 14/852,629

(22) Filed: Sep. 14, 2015

(65) Prior Publication Data

US 2017/0053177 A1 Feb. 23, 2017

(30) Foreign Application Priority Data

Aug. 20, 2015 (CN) .......................... 2015 1 0513061

(51) Int. Cl.
*G06K 9/00* (2006.01)
*G06K 9/03* (2006.01)
*G06K 9/62* (2006.01)
*G06T 5/20* (2006.01)
*G06T 5/00* (2006.01)
*G06K 9/46* (2006.01)

(52) U.S. Cl.
CPC .............. *G06K 9/03* (2013.01); *G06K 9/4604* (2013.01); *G06K 9/6202* (2013.01); *G06T 5/002* (2013.01); *G06T 5/20* (2013.01)

(58) Field of Classification Search
CPC ...... G06K 9/03; G06K 9/6202; G06K 9/4604; G06T 5/002; G06T 5/20
See application file for complete search history.

(56) References Cited

U.S. PATENT DOCUMENTS

| | | | | |
|---|---|---|---|---|
| 6,661,469 | B1 * | 12/2003 | Kawabata | .............. H04N 5/142 345/63 |
| 7,209,182 | B2 | 4/2007 | Kawabata et al. | |
| 2003/0076335 | A1 * | 4/2003 | Lai | ....................... G09G 3/2029 345/589 |
| 2004/0008282 | A1 | 1/2004 | Kawabata et al. | |

(Continued)

FOREIGN PATENT DOCUMENTS

| | | |
|---|---|---|
| CN | 1297643 | 5/2001 |
| CN | 102413271 | 4/2012 |

OTHER PUBLICATIONS

"Office Action of Taiwan Counterpart Application", issued on Oct. 24, 2016, p. 1-p. 4.

*Primary Examiner* — John Strege (74) *Attorney, Agent, or Firm* — Jianq Chyun IP Office (57) ABSTRACT

An image processing apparatus and an image processing method are provided. The image processing apparatus comprises a false contour detection circuit and a false contour reduction circuit. The false contour detection circuit is configured to detect a flat pixel distribution of an image input signal and correspondingly output a false contour coefficient. The false contour reduction circuit is coupled to the false contour detection circuit to receive the false contour coefficient, and is configured to perform false contour reduction on the image input signal according to the false contour coefficient, so as to correspondingly output an image output signal.

17 Claims, 9 Drawing Sheets

(56) References Cited

U.S. PATENT DOCUMENTS

| | | | |
|---|---|---|---|
| 2006/0153301 A1 | 7/2006 | Guleryuz | |
| 2006/0233456 A1* | 10/2006 | Ahn | G06T 7/0085 |
| | | | 382/275 |
| 2009/0060375 A1* | 3/2009 | Lim | G06T 5/002 |
| | | | 382/266 |
| 2010/0053200 A1* | 3/2010 | Correa | H04N 1/64 |
| | | | 345/600 |

* cited by examiner

IMAGE PROCESSING APPARATUS AND IMAGE PROCESSING METHOD

CROSS-REFERENCE TO RELATED APPLICATION

This application claims the priority benefit of Chinese application serial no. 201510513061.2, filed on Aug. 20, 2015. The entirety of the above-mentioned patent application is hereby incorporated by reference herein and made a part of this specification.

BACKGROUND

Field of the Invention

The invention is directed to an image processing technique and more particularly, to an image processing apparatus and an image processing method.

Description of Related Art

A false contour is caused by coarse quantization. The coarse quantization in most cases results in insufficient precision in image intensity. As a result, a smooth gradation in the image is converted into a step change. Such strip-like step change is referred to as a false contour. A false contour is an artifact in an image, which usually occurs in a region with the smooth gradation.

Before removing the false contour, false contour detection has to be performed on the image. The false contour features in two characteristics: steepness in spatial dimension and amplitude of the step change in intensity. In the conventional method for detecting the false contour generally, whether a certain pixel belongs to the false contour is determined by using a gradient magnitude. The gradient magnitude (or a mean and a variance of magnitude) of the false contour is low. In many cases, a gradient magnitude of some image details (e.g., weak edges or fine textures) is similar to the gradient magnitude of the false contour, and therefore, the use of the gradient magnitude is insufficient for describing a false contour curve. When some image details are detected as the false contours, the image details will be smoothed. Nevertheless, the convention method for detecting the false contour would lead to the loss of some image details.

SUMMARY

The invention provides an image processing apparatus and an image processing method capable of detecting a flat pixel distribution of an image input signal, so as to recognize a false contour in an image.

According to an embodiment of the invention, an image processing apparatus including a false contour detection circuit and a false contour reduction circuit is provided. The false contour detection circuit detects a flat pixel distribution of an image input signal and correspondingly outputs a false contour coefficient. The false contour reduction circuit is coupled to the false contour detection circuit to receive the false contour coefficient. The false contour reduction circuit performs false contour reduction on the image input signal according to the false contour coefficient, so as to correspondingly output an image output signal.

According to an embodiment of the invention, an image processing method adapted for an image processing apparatus is provided. The image processing method includes: detecting a flat pixel distribution of an image input signal to correspondingly generate a false contour coefficient; and performing false contour reduction on the image input signal according to the false contour coefficient, so as to correspondingly output an image output signal.

To sum up, the image processing apparatus and the image processing method capable of detecting the flat pixel distribution of the image input signal. The false contour detection circuit can recognize the false contour in the image according to the flat pixel distribution, so as to correspondingly output the false contour coefficient to the false contour reduction circuit. The false contour reduction circuit can perform the false contour reduction on the image input signal according to the false contour coefficient, and thereby, image details (e.g., weak edges or fine textures) can be prevented from being lost.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A term "couple (or connect)" used in the full text of the disclosure (including the claims) refers to any direct and indirect connections. For instance, if a first device is described to be coupled (or connected) to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Figure 1:
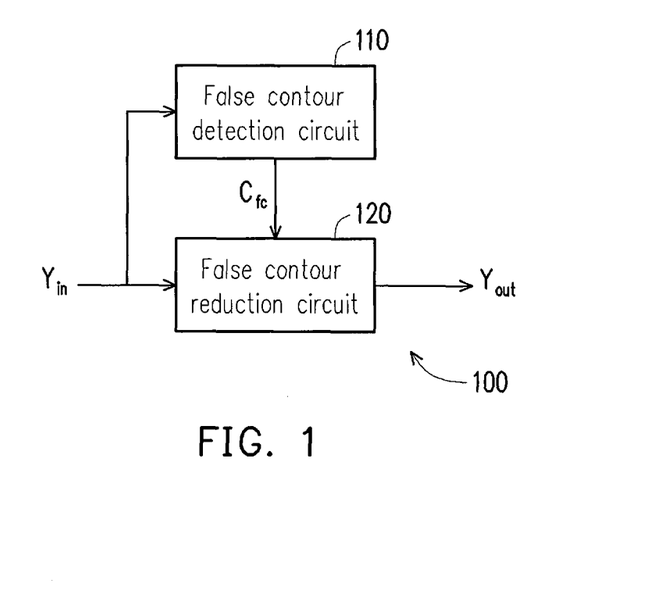
FIG. 1 is a schematic block diagram illustrating an image processing apparatus according to an embodiment of the invention.

FIG. 1 is a schematic block diagram illustrating an image processing apparatus 100 according to an embodiment of the invention. In the present embodiment, the image processing apparatus 100 may be applied between an image input apparatus (e.g., a DVD player, which is not shown) and a display (e.g., a TV, which is not shown), which is not limited in the present embodiment. The image processing apparatus 100 may perform false contour reduction on an image input signal $Y_{in}$ provided by the image input apparatus (not shown), so as to output an image output signal $Y_{out}$. Thereby, the image processing apparatus 100 may contribute to mitigating false contour phenomenon.

The image processing apparatus 100 includes a false contour detection circuit 110 and a false contour reduction circuit 120. The false contour detection circuit 110 receives the image input signal $Y_{in}$ from a former circuit (not shown). The image input signal $Y_{in}$ may be any type of image signal. For instance (but not limited to), the image input signal $Y_{in}$ may be a red signal, a green signal, a blue signal, luminance signal, a chrominance signal, a chroma signal or any other component signal of an image signal. The false contour detection circuit 110 may detect a flat pixel distribution of the image input signal $Y_{in}$ and correspondingly output a false contour coefficient $C_{fc}$.

Figure 2:
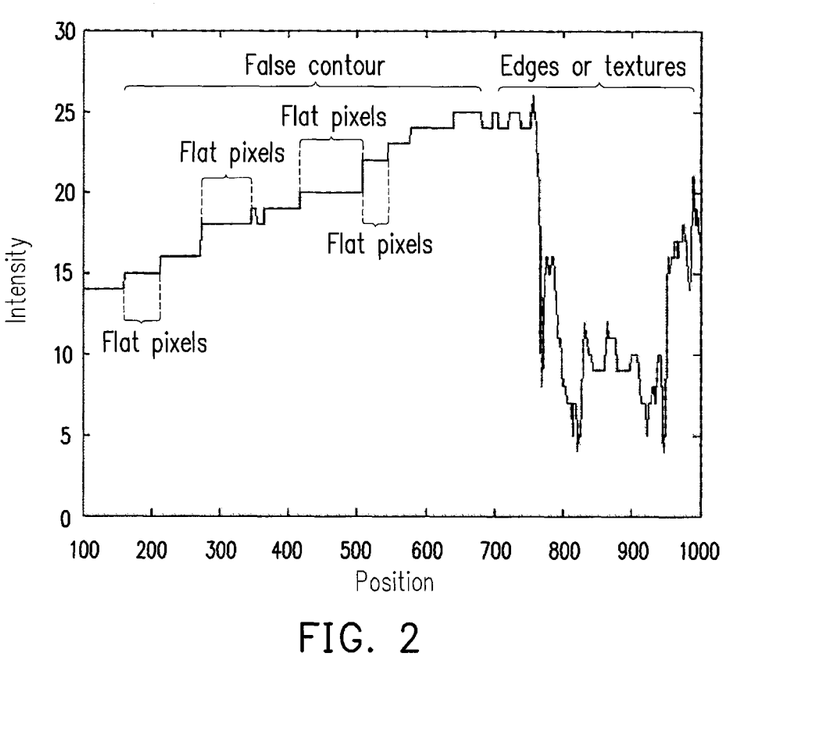
FIG. 2 is a schematic graph illustrating a relation between pixel positions and pixel intensities of the image input signal $Y_{in}$ according to an embodiment of the invention.

FIG. 2 is a schematic graph illustrating a relation between pixel positions and pixel intensities of the image input signal $Y_{in}$ according to an embodiment of the invention. In FIG. 2, the horizontal axis represents a position of a pixel, and the vertical axis represents an intensity (e.g., a luminance or other intensity) of a pixel. FIG. 2 illustrates, in a 1-dimensional (1-D) manner, intensities corresponding to different positions of the pixel in a 1-D space. In any way, persons with ordinary skill in the art can infer the content related to FIG. 2 to a 2-dimensional (2-D) space based on the teaching provided in this disclosure. In the right of FIG. 2, pixel positions (approximately from pixel positions 700 to 100 along the horizontal axis) having image edges or textures are illustrated, while in the left of FIG. 2, pixel positions (approximately from pixel positions 100 to 700 along the horizontal axis) having false contours are illustrated.

A false contour is caused by coarse quantization. After the coarse quantization is performed, a smooth gradation in an image is converted into a step change. Such strip-like step change is referred to as a false contour. The step change illustrated in the left of FIG. 2 is a false contour of the image input signal $Y_{in}$. The false contour (i.e., the step change) is formed by a plurality of flat pixels. In comparison with a gradient magnitude, a distribution of the flat pixels serves better for recognizing characteristics of the false contour. The flatter the pixel region is, the more visible (obvious) the false contour is. The false contour detection circuit 110 may detect a flat pixels distribution of the image input signal $Y_{in}$ and correspondingly output the false contour coefficient $C_{fc}$ to the false contour reduction circuit 120.

Referring to FIG. 1, the false contour reduction circuit 120 is coupled to the false contour detection circuit 110 to receive the false contour coefficient $C_{fc}$. The false contour reduction circuit 120 may collect the false contour coefficient $C_{fc}$ to obtain a false contour map. Thus, the false contour reduction circuit 120 may perform the false contour reduction on the image input signal $Y_{in}$ according to the false contour coefficient $C_{fc}$, so as to output the corresponding image output signal $Y_{out}$.

Figure 3:
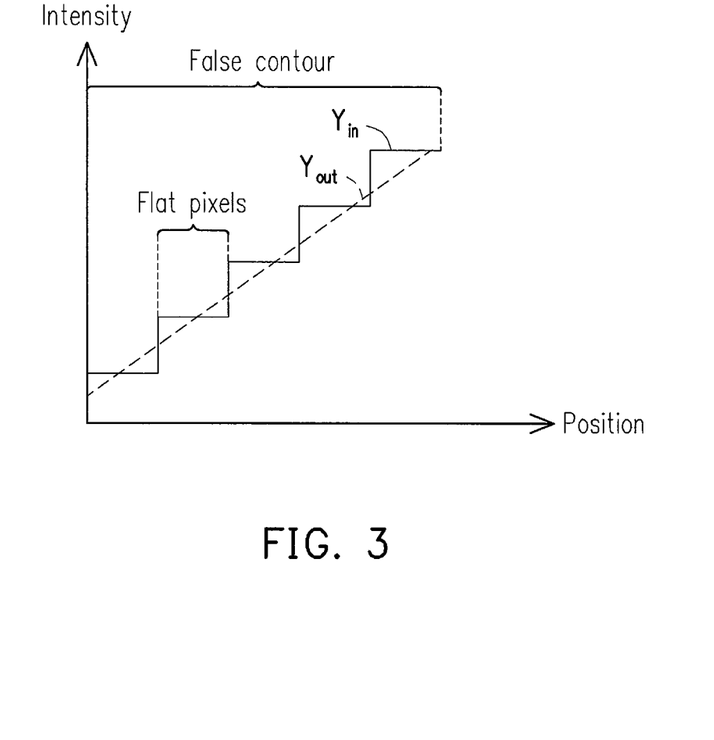
FIG. 3 is a schematic graph illustrating the false contour reduction performed on the image input signal $Y_{in}$ in the pixel region of the false contour by the false contour reduction circuit according to an embodiment of the invention.

FIG. 3 is a schematic graph illustrating the false contour reduction performed on the image input signal $Y_{in}$ in the pixel region of the false contour by the false contour reduction circuit 120 according to an embodiment of the invention. In FIG. 3, the horizontal axis represents a position of a pixel, and the vertical axis represents an intensity (e.g., a luminance) of a pixel. FIG. 3 illustrates, in a 1-D manner, pixel intensities corresponding to different positions in a 1-D space. In any way, the persons with ordinary skill in the art can infer the content related to FIG. 3 to a 2-D space based on the teaching provided in this disclosure. The false contour reduction circuit 120 may obtain a false contour region of the image input signal $Y_{in}$ according to the false contour coefficient $C_{fc}$. In the false contour region, the false contour reduction circuit 120 may perform the false contour reduction on the image input signal $Y_{in}$, so as to output a smoothed image output signal $Y_{out}$, as shown in FIG. 3.

Figure 4:
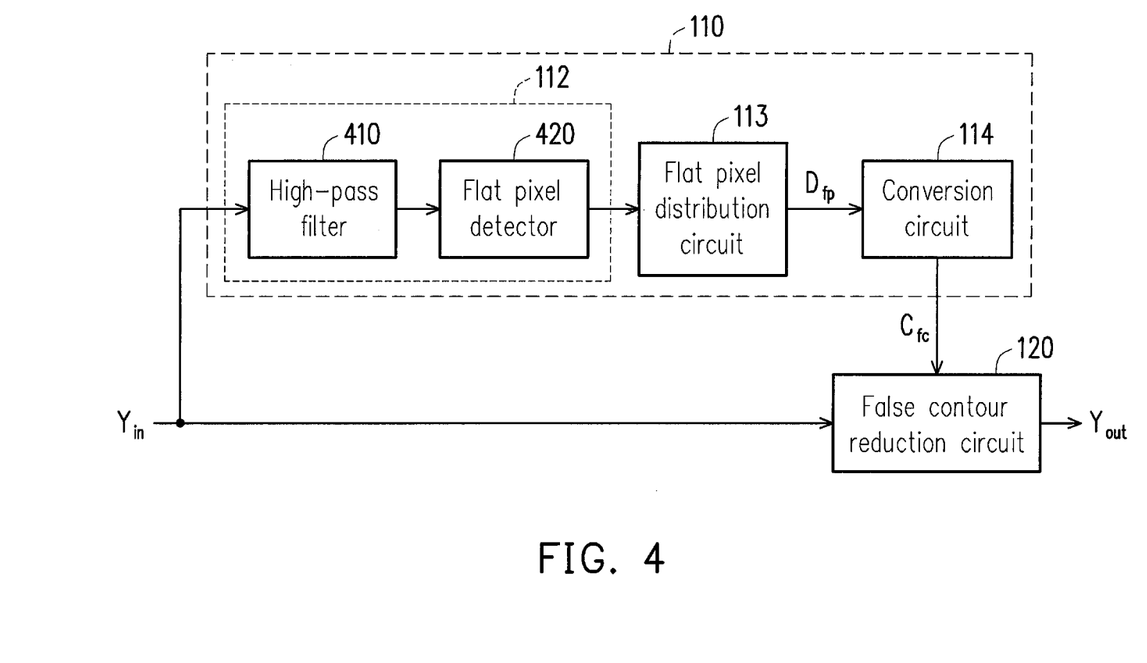
FIG. 4 is a schematic block circuit diagram illustrating the false contour detection circuit depicted in FIG. 1 according to an embodiment of the invention.

FIG. 4 is a schematic block circuit diagram illustrating the false contour detection circuit 110 depicted in FIG. 1 according to an embodiment of the invention. Referring to FIG. 4, the false contour detection circuit 110 includes a flat pixel detection circuit 112, a flat pixel distribution circuit 113 and a conversion circuit 114. The flat pixel detection circuit 112 may determine whether each of a plurality of pixels of the image input signal $Y_{in}$ is a flat pixel to output a flat pixel detection result to the flat pixel distribution circuit 113. In the embodiment illustrated in FIG. 4, the flat pixel detection circuit 112 includes a high-pass filter 410 and a flat pixel detector 420. In other embodiments, the implementation of the flat pixel detection circuit 112 should not be limited to the embodiment illustrated in FIG. 4.

The high-pass filter 410 may extract high-frequency information from the image input signal $Y_{in}$ to the flat pixel detector 420. For instance (but not limited to), the high-pass filter 410 may compare the current pixel with an adjacent pixel in the image input signal $Y_{in}$ and output a comparison result to the flat pixel detector 420. For example, the high-pass filter 410 may calculate $Y_{in}(n)-Y_{in}(n-1)$, where $Y_{in}(n)$ represents an intensity of a pixel (i.e., the current pixel) whose position is n in the image input signal $Y_{in}$, and $Y_{in}(n-1)$ represents an intensity of a pixel (i.e., the adjacent pixel) whose position is (n-1) in the image input signal $Y_{in}$. The high-pass filter 410 may output the calculation result of $Y_{in}(n)-Y_{in}(n-1)$ to the flat pixel detector 420.

The flat pixel detector 420 is coupled to the high-pass filter 410 to receive the comparison result. The flat pixel detector 420 may determine whether the current pixel is a flat pixel according to the comparison result of the high-pass filter 410 to output the flat pixel detection result to the flat pixel distribution circuit 113. For instance (but not limited to), when a result of the high-pass filter 410 calculating $Y_{in}(n)-Y_{in}(n-1)$ is about 0 (or equal to 0), the flat pixel detector 420 may determine the pixel (i.e., the current pixel) whose position is n in the image input signal $Y_{in}$ as a flat pixel. In other embodiments, the flat pixel detector 420 may compare calculation results of the current pixel (e.g., the pixel whose position is n) with a plurality of adjacent pixels (e.g., pixels whose positions are (n-4), (n-3), (n-2) and (n-1)). For instance, if it is assumed that the calculation results output to the flat pixel detector 420 by the high-pass filter 410 include $Y_{in}(n-3)-Y_{in}(n-4)=0$, $Y_{in}(n-2)-Y_{in}(n-3)=0$, $Y_{in}(n-1)-Y_{in}(n-2)=0$, $Y_{in}(n)-Y_{in}(n-1)=0$, the flat pixel detector 420 may determine the pixel (i.e., the current pixel) whose position in the image input signal $Y_{in}$ is n as the flat pixel.

The flat pixel distribution circuit 113 is coupled to the flat pixel detector 420 of the flat pixel detection circuit 112 to receive the flat pixel detection result. The flat pixel distribution circuit 113 may count a number (which is referred to as a flat pixel number $D_{fp}$ hereinafter) of the pixels which are determined as the flat pixels within an adjacent range of the current pixel according to the flat pixel detection result provided by the flat pixel detection circuit 112. In different application example, the adjacent range may be a 1-D window containing the current pixel in an image frame, or a 2-D window containing the current pixel in the image frame. A length of the 1-D window, and a length and a width of the 2-D window may be determined depending on design requirements. The flat pixel distribution circuit 113 may provide the flat pixel number $D_{fp}$ of the adjacent range to the conversion circuit 114.

The conversion circuit 114 is coupled to the flat pixel distribution circuit 113 to receive the flat pixel number $D_{fp}$ of the adjacent range. The conversion circuit 114 may convert the flat pixel number $D_{fp}$ provided by the flat pixel distribution circuit 113 into the false contour coefficient $C_{fc}$ of the current pixel. The conversion circuit 114 may convert the flat pixel number $D_{fp}$ into the false contour coefficient $C_{fc}$ of the current pixel by using any manner. For instance (but not limited to), the conversion circuit 114 may convert the flat pixel number $D_{fp}$ into the false contour coefficient $C_{fc}$ of the current pixel according to a specific conversion function, a specific linear curve, a specific piece-wise linear curve or a non-linear curve. The range of values of the false contour coefficient $C_{fc}$ may be determined depending on design requirements. In some application examples, the false contour coefficient $C_{fc}$ may be a real number between 0 and 1.

Figure 5:
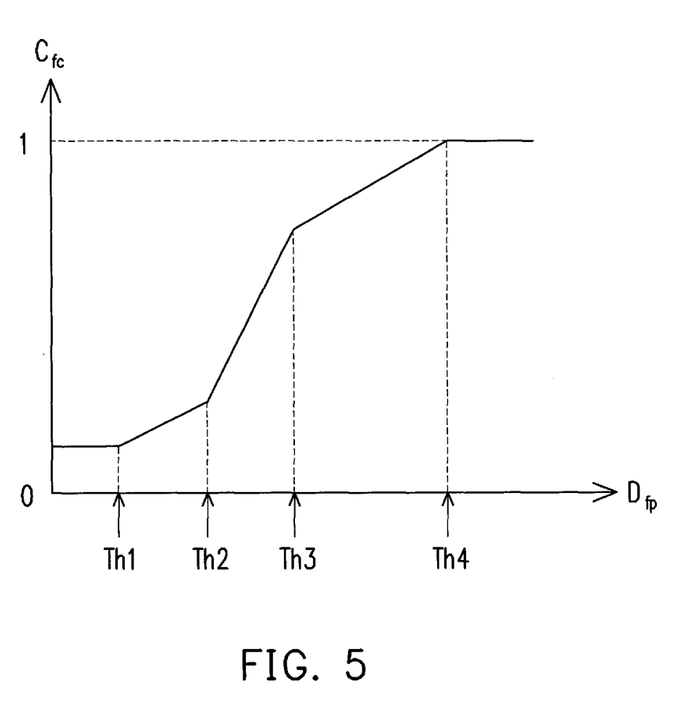
FIG. 5 is a schematic conversion graph illustrating the conversion circuit converting the flat pixel number $D_{fp}$ into the false contour coefficient $C_{fc}$ according to an embodiment of the invention.

FIG. 5 is a schematic conversion graph illustrating the conversion circuit 114 converting the flat pixel number $D_{fp}$ into the false contour coefficient $C_{fc}$ according to an embodiment of the invention. In FIG. 5, the horizontal axis represents the flat pixel number $D_{fp}$, and the vertical axis represents the false contour coefficient $C_{fc}$. FIG. 5 illustrates an example of a piece-wise linear curve, where the flat pixel number $D_{fp}$ is divided into 5 intervals by thresholds Th1, Th2, Th3 and Th4. The conversion circuit 114 converts the flat pixel number $D_{fp}$ into the false contour coefficient $C_{fc}$ by using different linear curves within the 5 intervals, respectively.

It should be noted that in different embodiments, the function related to each of the false contour detection circuit 110, the flat pixel detection circuit 112, the flat pixel distribution circuit 113, the conversion circuit 114, the high-pass filter 410, the flat pixel detector 420 and/or the false contour reduction circuit 120 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

Figure 6:
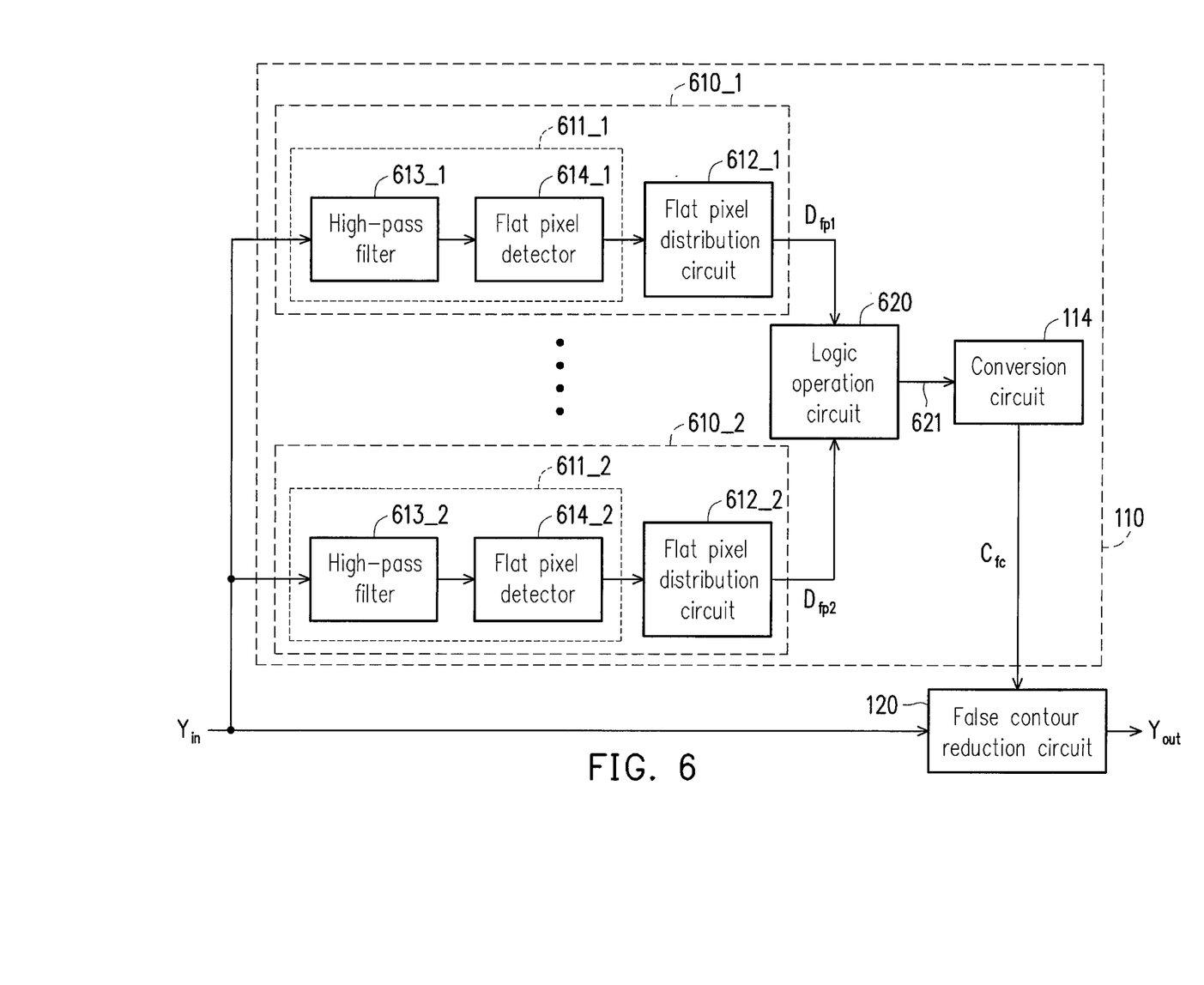
FIG. 6 is a schematic block circuit diagram illustrating the false contour detection circuit depicted in FIG. 1 according to another embodiment of the invention.

FIG. 6 is a schematic block circuit diagram illustrating the false contour detection circuit 110 depicted in FIG. 1 according to another embodiment of the invention. Referring to FIG. 6, the false contour detection circuit 110 includes a plurality of flat pixel distribution channels, a logic operation circuit 620 and a conversion circuit 114. The flat pixel distribution channels may be two or more flat pixel distribution channels, e.g., flat pixel distribution channels 610_1 and 610_2 illustrated in FIG. 6. Each of the different flat pixel distribution channels may serve for determining whether a plurality of pixels in the image input signal $Y_{in}$ is a flat pixel along a corresponding direction among a plurality of directions. Each of the different flat pixel distribution channels may also serve for counting a flat pixel number of the pixels which are determined as flat pixels within an adjacent range of a current pixel along the corresponding direction among the directions.

For instance (but not limited to), the flat pixel distribution channel 610_1 may determine whether each of the pixels of the image input signal $Y_{in}$ is the flat pixel along a horizontal direction of the image frame and count a number (i.e., a flat pixel number $D_{fp1}$) of the pixels which are determined as the flat pixels among the pixels within the adjacent range of the current pixel along the horizontal direction. In the same way, the flat pixel distribution channel 610_2 may determine whether each of the pixels of the image input signal $Y_{in}$ is the flat pixel along a vertical direction of the image frame and count a number (i.e., a flat pixel number $D_{fp2}$) of the pixels which are determined as the flat pixels among the pixels within the adjacent range of the current pixel along the vertical direction.

In the embodiment illustrated in FIG. 6, the flat pixel distribution channel 610_1 includes a flat pixel detection circuit 611_1 and a flat pixel distribution circuit 612_1. The flat pixel detection circuit 611_1 may determine whether each of the pixels of the image input signal $Y_{in}$ is the flat pixel along a corresponding direction (e.g., the horizontal direction of the image frame) to output a flat pixel detection result to the flat pixel distribution circuit 612_1. In the embodiment illustrated in FIG. 6, the flat pixel detection circuit 611_1 includes a high-pass filter 613_1 and a flat pixel detector 614_1. The high-pass filter 613_1 may extract the high-frequency information from the image input signal $Y_{in}$ to the flat pixel detector 614_1. For instance (but not limited to), the high-pass filter 613_1 may compare a difference between the current pixel and the adjacent pixel in the image input signal $Y_{in}$ along the horizontal direction of the image frame and output the comparison result to the flat pixel detector 614_1. The high-pass filter 613_1 may refer to the description with respect to the high-pass filter 410 illustrated in FIG. 4 and thus, will not be repeatedly described. The flat pixel detector 614_1 is coupled to the high-pass filter 613_1 to receive the comparison result. The flat pixel detector 614_1 may determine whether the current pixel is the flat pixel according to the comparison result of the high-pass filter 613_1 to output the flat pixel detection result to the flat pixel distribution circuit 612_1. The flat pixel detector 614_1 may refer to the description with respect to the flat pixel detector 420 illustrated in FIG. 4 and thus, will not be repeatedly described.

The flat pixel distribution circuit 612_1 is coupled to the flat pixel detector 614_1 of the flat pixel detection circuit 611_1 to receive the flat pixel detection result. The flat pixel distribution circuit 612_1 may count a number (i.e., the flat pixel number $D_{fp1}$) of the pixels which are determined as the flat pixels among the pixels within the adjacent range of the current pixel along a corresponding direction (e.g., the horizontal direction of the image frame) according to the flat pixel detection result provided by the flat pixel detection circuit 611_1. The adjacent range may be a 1-D window containing the current pixel along the horizontal direction in the image frame. The flat pixel distribution circuit 612_1 may refer to the description with respect to the flat pixel distribution circuit 113 as illustrated in FIG. 4 and thus, will not be repeatedly described.

In the embodiment illustrated in FIG. 6, the flat pixel distribution channel 610_2 includes a flat pixel detection circuit 611_2 and a flat pixel distribution circuit 612_2. The flat pixel detection circuit 611_2 may determine whether each of the pixels of the image input signal $Y_{in}$ is the flat pixel along a corresponding direction (e.g., the vertical direction of the image frame) to output flat pixel detection result to the flat pixel distribution circuit 612_2. In the embodiment illustrated in FIG. 6, the flat pixel detection circuit 611_2 includes a high-pass filter 613_2 and a flat pixel detector 614_2. The high-pass filter 613_2 may extract the high-frequency information from the image input signal $Y_{in}$ to the flat pixel detector 614_2. For instance (but not limited to), the high-pass filter 613_2 compare a difference between the current pixel and an adjacent pixel in the image input signal $Y_{in}$ along the vertical direction of the image frame and output the comparison result to the flat pixel detector 6142. The high-pass filter 613_2 may refer to the description with respect to the high-pass filter 410 illustrated in FIG. 4 and thus, will not be repeatedly described. The flat pixel detector 614_2 is coupled to the high-pass filter 613_2 to receive the comparison result. The flat pixel detector 614_2 may determine whether the current pixel is the flat pixel according to the comparison result of the high-pass filter 613_2 to output the flat pixel detection result to flat pixel distribution circuit 612_2. The flat pixel detector 614_2 may refer to the description with respect to the flat pixel detector 420 illustrated in FIG. 4 and thus, will not be repeatedly described.

The flat pixel distribution circuit 612_2 is coupled to the flat pixel detector 614_2 of the flat pixel detection circuit 611_2 to receive the flat pixel detection result. The flat pixel distribution circuit 612_2 count a number (i.e., the flat pixel number $D_{fp2}$) of the pixels which are determined as the flat pixels among the pixels within the adjacent range of the current pixel along a corresponding direction (e.g., the vertical direction of the image frame) according to the flat pixel detection result provided by the flat pixel detection circuit 611_2. The adjacent range may be a 1-D window containing the current pixel along the vertical direction in the image frame. The flat pixel distribution circuit 612_2 may refer to the description with respect to the flat pixel distribution circuit 113 illustrated in FIG. 4 and thus, will not be repeatedly described.

The logic operation circuit 620 is coupled to the flat pixel distribution channels (e.g., 610_1 and 610_2) to receive the flat pixel numbers (e.g., $D_{fp1}$ and $D_{fp2}$) in different directions. The logic operation circuit 620 may calculate a flat value 621 of the current pixel by using at least one of the flat pixel numbers $D_{fp1}$ and $D_{fp2}$. For instance (but not limited to), the logic operation circuit 620 may serve the minimum of the flat pixel numbers $D_{fp1}$ and $D_{fp2}$ as the flat value 621 of the current pixel. In other embodiments, the logic operation circuit 620 may calculate a mean of the flat pixel numbers $D_{fp1}$ and $D_{fp2}$ and serve the mean as the flat value 621 of the current pixel.

The conversion circuit 114 is coupled to the logic operation circuit 620 to receive the flat value 621. The conversion circuit 114 may convert the flat value 621 into the false contour coefficient $C_{fc}$ of the current pixel. The conversion circuit 114 illustrated in FIG. 6 may refer to the description with respect to the conversion circuit 114 illustrated in the FIG. 4 and FIG. 5 and thus, will not be repeatedly described.

It should be noted that in different embodiments, the function related to each of the flat pixel distribution channel 610_1, the flat pixel distribution channel 610_2, the flat pixel detection circuit 611_1, the flat pixel detection circuit 611_2, the flat pixel distribution circuit 612_1, the flat pixel distribution circuit 612_2, the high-pass filter 613_1, the high-pass filter 613_2, the flat pixel detector 614_1, the flat pixel detector 614_2, the logic operation circuit 620 and/or the conversion circuit 114 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

Figure 7:
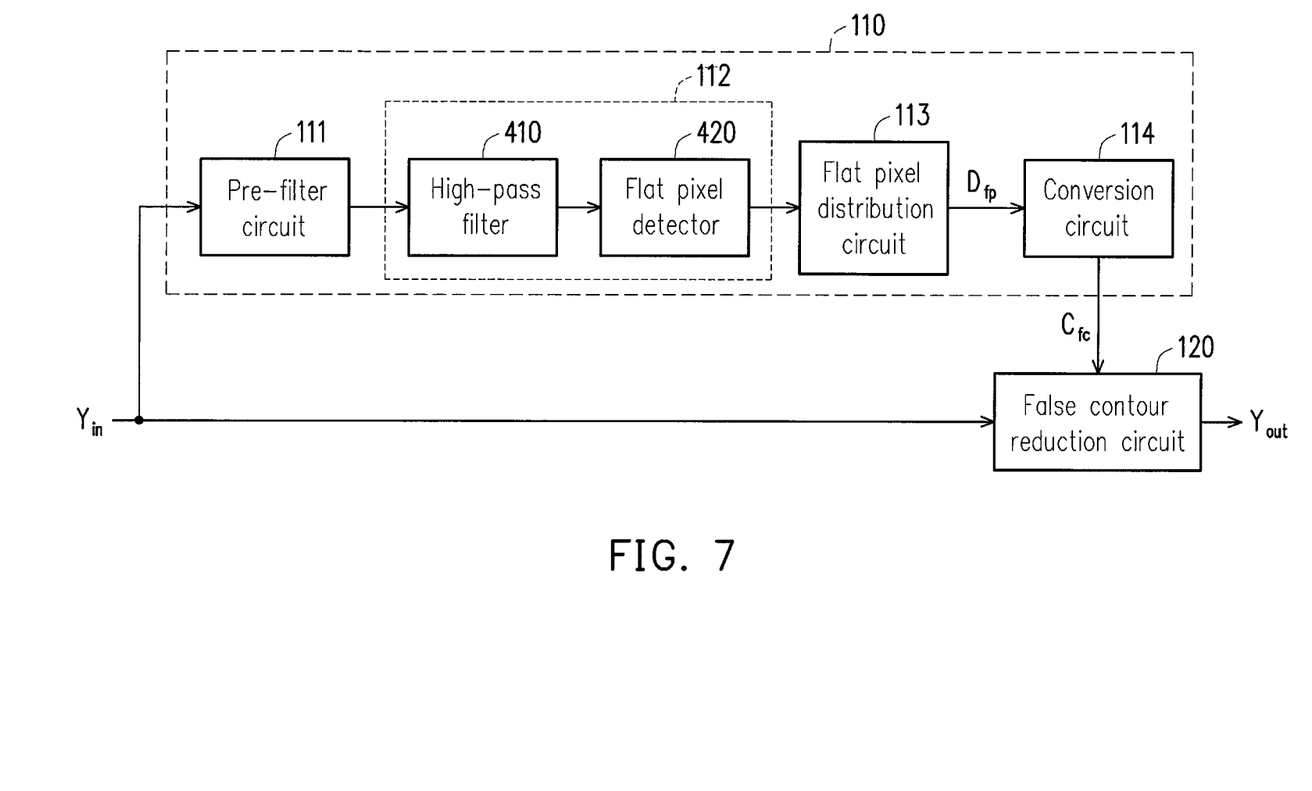
FIG. 7 is a schematic block circuit diagram illustrating the false contour detection circuit depicted in FIG. 1 according to yet another embodiment of the invention.

FIG. 7 is a schematic block circuit diagram illustrating the false contour detection circuit 110 depicted in FIG. 1 according to yet another embodiment of the invention. Referring to FIG. 7, the false contour detection circuit 110 includes a pre-filter circuit 111, a flat pixel detection circuit 112, a flat pixel distribution circuit 113 and a conversion circuit 114. The pre-filter circuit 111 may filter noise from the image input signal $Y_{in}$ and output a pre-filtered signal to the flat pixel detection circuit 112. The flat pixel detection circuit 112 is coupled to the pre-filter circuit 111 to receive the pre-filtered signal. The flat pixel detection circuit 112 may determine whether each of a plurality of pixels of the pre-filtered signal is a flat pixel to output a flat pixel detection result to the flat pixel distribution circuit 113. In the embodiment illustrated in FIG. 7, the flat pixel detection circuit 112 includes a high-pass filter 410 and a flat pixel detector 420. The high-pass filter 410 may compare a difference between the current pixel with an adjacent pixel in the pre-filtered signal provided by the pre-filter circuit 111 to output a comparison result to the flat pixel detector 420. The flat pixel detection circuit 112, the flat pixel distribution circuit 113, the conversion circuit 114, the high-pass filter 410 and the flat pixel detector 420 illustrated in FIG. 7 may refer to the descriptions with respect to the flat pixel detection circuit 112, the flat pixel distribution circuit 113, the conversion circuit 114, the high-pass filter 410 and the flat pixel detector 420 illustrated in FIG. 4 and thus, will not be repeatedly described.

Figure 8:
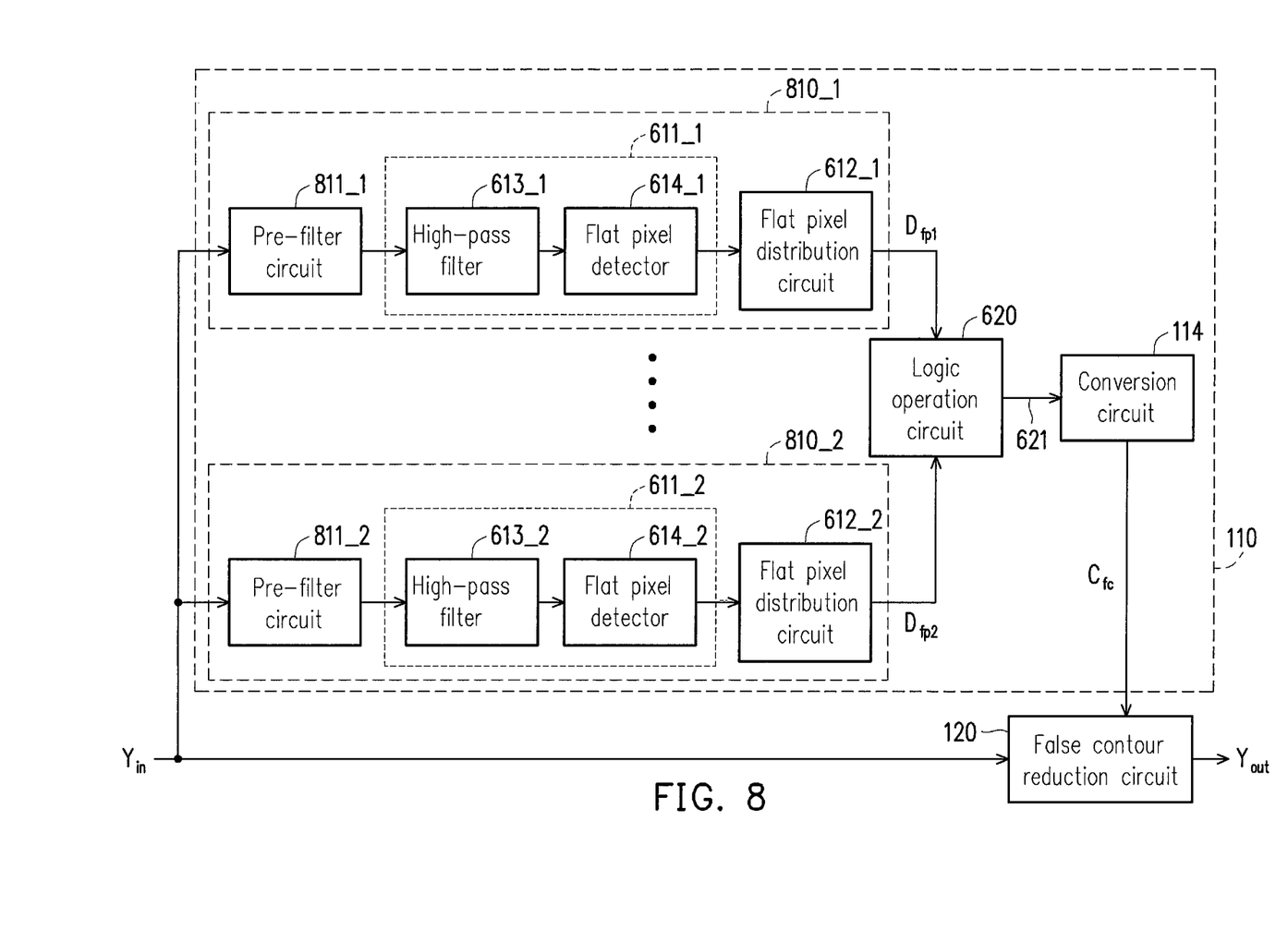
FIG. 8 is a schematic block circuit diagram illustrating the false contour detection circuit depicted in FIG. 1 according to still another embodiment of the invention.

FIG. 8 is a schematic block circuit diagram illustrating the false contour detection circuit 110 depicted in FIG. 1 according to still another embodiment of the invention. Referring to FIG. 8, the false contour detection circuit 110 includes a plurality of flat pixel distribution channels, a logic operation circuit 620 and a conversion circuit 114. The flat pixel distribution channels may be two or more flat pixel distribution channels, e.g., flat pixel distribution channels 810_1 and 810_2 illustrated in FIG. 8. The flat pixel distribution channel 810_1, the flat pixel distribution channel 810_2, the logic operation circuit 620 and the conversion circuit 114 illustrated in FIG. 8 may refer to the descriptions with respect to the flat pixel distribution channel 610_1, the flat pixel distribution channel 610_2, the logic operation circuit 620 and the conversion circuit 114 illustrated in FIG. 6 and thus, will not be repeatedly described.

In the embodiment illustrated in FIG. 8, the flat pixel distribution channels 810_1 includes a pre-filter circuit 811_1, a flat pixel detection circuit 611_1 and a flat pixel distribution circuit 612_1. The pre-filter circuit 811_1 may filter noise from the image input signal $Y_{in}$ and output a pre-filtered signal to the flat pixel detection circuit 611_1. The flat pixel detection circuit 611_1 is coupled to the pre-filter circuit 811_1 to receive the pre-filtered signal. The flat pixel detection circuit 611_1 may determine whether each of a plurality of pixels of the pre-filtered signal is a flat pixel along a corresponding direction (e.g., the horizontal direction of the image frame) to output a flat pixel detection result to the flat pixel distribution circuit 612_1. In the embodiment illustrated in FIG. 8, the flat pixel detection circuit 611_1 includes a high-pass filter 613_1 and a flat pixel detector 614_1. The high-pass filter 613_1 may compare difference between the current pixel with an adjacent pixel in the pre-filtered signal provided by the pre-filter circuit 811_1 along the horizontal direction of the image frame and output a comparison result to the flat pixel detector 614_1. The flat pixel detection circuit 611_1, the flat pixel distribution circuit 612_1, the high-pass filter 613_1 and the flat pixel detector 614_1 illustrated in FIG. 8 may refer to the descriptions with respect to the flat pixel detection circuit 611_1, the flat pixel distribution circuit 612_1, the high-pass filter 613_1 and the flat pixel detector 614_1 illustrated in FIG. 6 and thus, will not be repeatedly described.

In the embodiment illustrated in FIG. 8, the flat pixel distribution channel 810_2 includes a pre-filter circuit 811_2, a flat pixel detection circuit 611_2 and a flat pixel distribution circuit 612_2. The pre-filter circuit 811_2 may filter noise from the image input signal $Y_{in}$ and output the pre-filtered signal to the flat pixel detection circuit 611_2. The flat pixel detection circuit 611_2 is coupled to the pre-filter circuit 811_2 to receive the pre-filtered signal. The flat pixel detection circuit 611_2 may determine whether each of the pixels of the pre-filtered signal is the flat pixel along a corresponding direction (e.g., the vertical direction of the image frame) to output the flat pixel detection result to the flat pixel distribution circuit 612_2. In the embodiment illustrated in FIG. 8, the flat pixel detection circuit 611_2 includes a high-pass filter 613_2 and a flat pixel detector 614_2. The high-pass filter 613_2 may compare the difference between the current pixel with the adjacent pixel in the pre-filtered signal provided by the pre-filter circuit 811_2 along the vertical direction of the image frame and output the comparison result to the flat pixel detector 614_2. The flat pixel detection circuit 611_2, the flat pixel distribution circuit 612_2, the high-pass filter 613_2 and the flat pixel detector 614_2 illustrated in FIG. 8 may refer to the descriptions with respect to the flat pixel detection circuit 611_2, the flat pixel distribution circuit 612_2, the high-pass filter 613_2 and the flat pixel detector 614_2 illustrated in FIG. 6 and thus, will not be repeatedly described.

It should be noted that in different embodiments, the function related to each of the pre-filter circuit 111, the pre-filter circuit 811_1 and/or the pre-filter circuit 811_2 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

Figure 9:
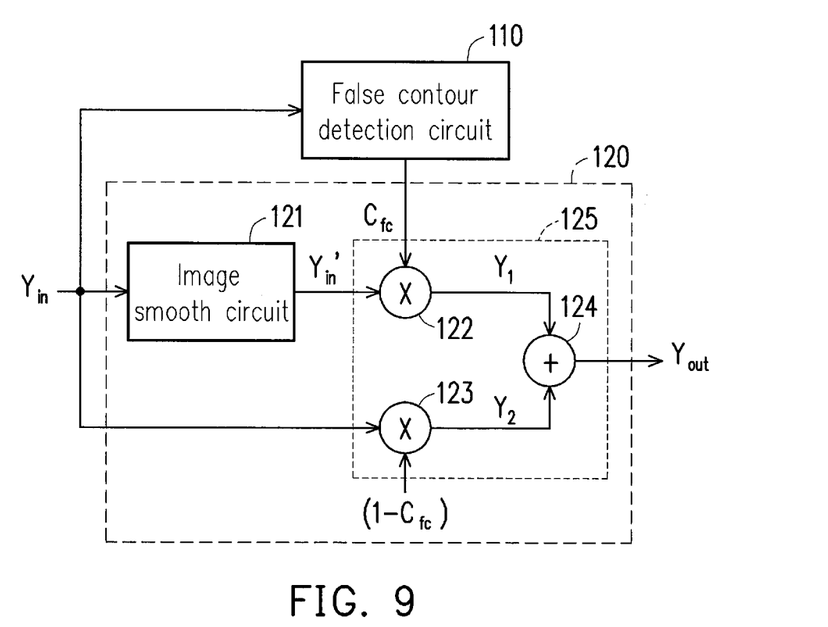
FIG. 9 is a schematic block circuit diagram illustrating the false contour reduction circuit depicted in FIG. 1 according to an embodiment of the invention.

FIG. 9 is a schematic block circuit diagram illustrating the false contour reduction circuit 120 depicted in FIG. 1 according to an embodiment of the invention. Referring to FIG. 9, the false contour reduction circuit 120 includes an image smooth circuit 121 and a combiner 125. The image smooth circuit 121 may smooth the image input signal $Y_{in}$, and output a smoothed signal $Y_{in}'$. The smooth operation referred to herein may refer to the related description of FIG. 3 or the description that will be set forth below. In some embodiments, the image smooth circuit 121 may smooth the image input signal $Y_{in}$ according to a spatial weight $W_s$ and a range weight $W_r$, so as to output the smoothed signal $Y_{in}'$. After the image input signal $Y_{in}$ is smoothed by the image smooth circuit 121, the false contour is removed. The combiner 125 is coupled to the image smooth circuit 121 to receive the smoothed signal. The combiner 125 is configured to combine the smoothed signal $Y_{in}'$ and the image input signal $Y_{in}$ according to the false contour coefficient $C_{fc}$ of the current pixel, so as to obtain the image output signal $Y_{out}$ of the current pixel.

In the embodiment illustrated in FIG. 9, the combiner 125 comprises a first multiplier 122, a second multiplier 123 and an adder 124. The first multiplier 122 is coupled to the image smooth circuit 121 to receive the smoothed signal $Y_{in}'$ of the current pixel. The first multiplier 122 is coupled to the false contour detection circuit 110 to receive the false contour coefficient $C_{fc}$ of the current pixel. The first multiplier 122 may calculate $Y_1=C_{fc}*Y_{in}'$ to output a first pixel value $Y_1$ of the current pixel. A value range of the false contour coefficient $C_{fc}$ may be determined depending on design requirements. In some application examples, the false contour coefficient $C_{fc}$ may be a real number between 0 and 1.

The second multiplier 123 may receive the image input signal $Y_{in}$ of the current pixel. The second multiplier 123 is coupled to the false contour detection circuit 110 to receive the false contour coefficient $C_{fc}$. The second multiplier 123 may calculate $Y_2=(1-C_{fc})*Y_{in}$ to output a second pixel value $Y_2$ of the current pixel. The adder 124 is coupled to the first multiplier 122 and the second multiplier 123 to receive the first pixel value $Y_1$ and the second pixel value $Y_2$. The adder 124 may calculate $Y_{out}=Y_1+Y_2=C_{fc}*Y_{in}'+(1-C_{fc})*Y_{in}$ to output the image output signal $Y_{out}$ of the current pixel.

After the image input signal $Y_{in}$ is smoothed by the image smooth circuit 121, the false contour and image details are removed. The false contour reduction circuit 120 may perform a weighting and blending operation on the smoothed signal $Y_{in}'$ and the original image input signal $Y_{in}$ dynamically and flexibly according to the false contour map (i.e., the false contour coefficient $C_{fc}$). The pixel positions with the higher probability to appear the false contour in the image frame have the greater values of the false contour coefficients $C_{fc}$, such that the component of the smoothed signal $Y_{in}'$ in the image output signal $Y_{out}$ is dramatically increased. Thus, the false contour may be effectively removed. The pixel positions with the lower probability to appear the false contour in the image frame have the smaller values of the false contour coefficient $C_{fc}$, such that the component of the original image input signal $Y_{in}$ is dramatically increased. Thus, the image details (e.g., the weak edges or the fine textures) may remain.

It should be noted that in different embodiments, the function related to each of the false contour detection circuit 110, the false contour reduction circuit 120, the image smooth circuit 121, the first multiplier 122, the second multiplier 123 and/or the adder 124 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

Figure 10:
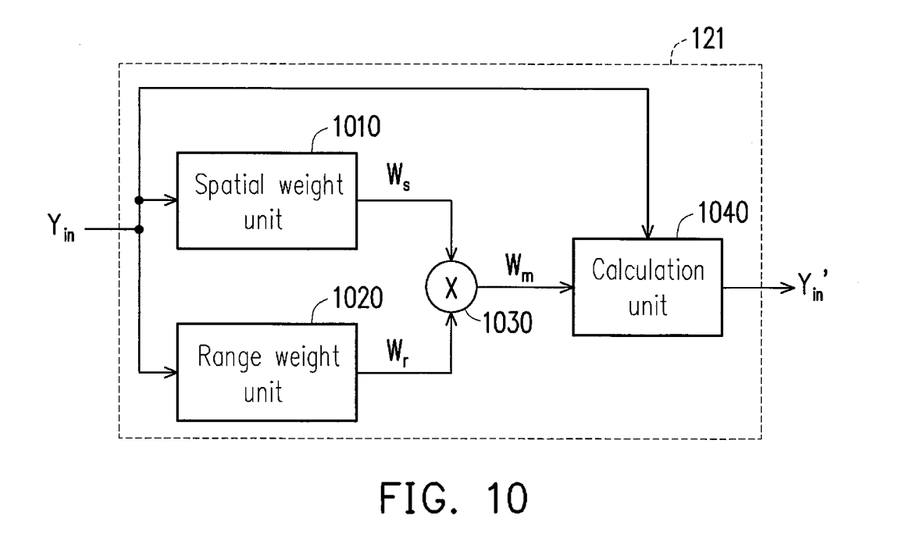
FIG. 10 is a schematic block circuit diagram illustrating the image smooth circuit depicted in FIG. 9 according to an embodiment of the invention.

FIG. 10 is a schematic block circuit diagram illustrating the image smooth circuit 121 depicted in FIG. 9 according to an embodiment of the invention. Referring to FIG. 10, the image smooth circuit 121 includes a spatial weight unit 1010, a range weight unit 1020, a third multiplier 1030 and a calculation unit 1040. The spatial weight unit 1010 may define an adjacent range of the current pixel. For instance (but not limited to), in some embodiments, the spatial weight unit 1010 may calculate a Gauss distance for the current pixel by using the Gauss function and determine the adjacent range of the current pixel based on the Gauss distance. In other embodiments, the spatial weight unit 1010 may determine the adjacent range of the current pixel by using a distance threshold (which is determined depending on design requirements). The adjacent range includes a plurality of adjacent pixels. The spatial weight unit 1010 may determine a spatial weight $W_s$ of each of the adjacent pixels according to a spatial distance between the current pixel and each of the adjacent pixels. For instance, if it is assumed that a spatial distance from the current pixel $Y_{in}(n)$ to an adjacent pixel $Y_{in}(n-1)$ is 1 "pixel distance", and thereby, the spatial weight unit 1010 may determine that the spatial weight $W_s$ of the adjacent pixel $Y_{in}(n-1)$ is w1, while if it is assumed that the spatial distance from the current pixel $Y_{in}(n)$ to the adjacent pixels $Y_{in}(n-2)$ is 2 "pixel distances", the spatial weight unit 1010 may determine that the spatial weight $W_s$ of the adjacent pixels $Y_{in}(n-2)$ is w2, where w2 is less than w1. The values w1 and w2 of the spatial weight $W_s$ may be determined depending on design requirements.

The range weight unit 1020 may define a range window of the current pixel within the adjacent range. The range weight unit 1020 may determine a range weight $W_r$ of each of the adjacent pixels according to a value of the current pixel and the range window. For instance, if it is assumed that a distance, $|Y_{in}(n)-Y_{in}(n-1)|$, between the value $Y_{in}(n)$ of the current pixel and the value $Y_{in}(n-1)$ of an adjacent pixel in a range window is 0, the range weight unit 1020 may determine the range weight $W_r$ of the adjacent pixel $Y_{in}(n-1)$ is w3, while if it is assumed that a distance, $|Y_{in}(n)-Y_{in}(n-2)|$ between the value $Y_{in}(n)$ of the current pixel and the value $Y_{in}(n-2)$ of the adjacent pixel in the range window is 2, the range weight unit 1020 may determine the range weight $W_r$ of the adjacent pixel $Y_{in}(n-2)$ is w4, where w4 is less than w3. The values w3 and w4 of the spatial weight $W_r$ may be determined depending on design requirements.

The third multiplier 1030 is coupled to the spatial weight unit 1010 and the range weight unit 1020 to receive the spatial weight $W_s$ and the range weight $W_r$, and may output a weight product $W_m$ of the spatial weight $W_s$ multiplying the range weight $W_r$, where $W_m = W_s * W_r$. The calculation unit 1040 is coupled to the third multiplier 1030 to receive the weight products $W_m$ of the adjacent pixels. The calculation unit 1040 may symmetrize the weight products $W_m$ of the adjacent pixels by using the current pixel as the center to obtain the symmetrized weights $W_m'$ of the adjacent pixels. The calculation unit 1040 may calculate a weighted average of pixel values of the adjacent pixels by using the symmetrized weights $W_m'$ to obtain the smoothed signal $Y_{in}'$ of the current pixel.

Figure 11:
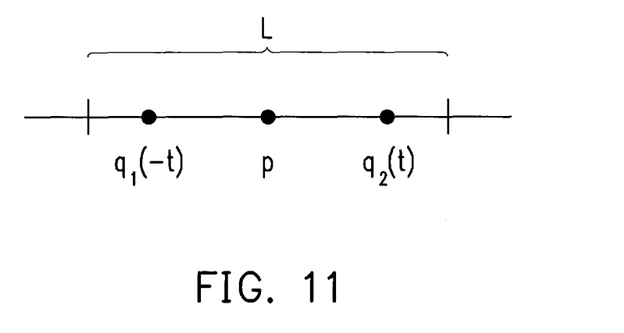
FIG. 11 is a schematic chart illustrating a scenario of symmetrizing the weight products $W_m$ of the adjacent pixels according to an embodiment of the invention.

FIG. 11 is a schematic chart illustrating a scenario where the calculation unit 1040 symmetrizes the weight products $W_m$ of the adjacent pixels depicted in FIG. 10 according to an embodiment of the invention. Referring to FIG. 10 and FIG. 11, the calculation unit 1040 may collect the weight products $W_m$ of different pixels provided by the third multiplier 1030 in one image frame. In FIG. 11, a pixel p represents the current pixel, and a range L represents the adjacent range of the current pixel p. There is a plurality of adjacent pixels in the adjacent range L, e.g., adjacent pixels $q_1(-t)$ and $q_2(t)$ as shown in FIG. 11 or more pixels (which is not shown). The calculation unit 1040 symmetrizes the weight products $W_m$ of the adjacent pixels by using the current pixel p as the center. The calculation unit 1040 may define an adjacent range L by using the current pixel p as the center in a 1-D space (e.g., along the horizontal direction of the image frame), so as to select a plurality of spatial symmetrical pixels from the adjacent pixels in the adjacent range L. For instance, the calculation unit 1040 may select two spatial symmetrical pixels, e.g., adjacent pixels $q_1(-t)$ and $q_2(t)$, from the adjacent pixels in the adjacent range L. A distance from the adjacent pixel $q_1(-t)$ to the current pixel p is equal to a distance from the adjacent pixel $q_2(t)$ to the current pixel p, the adjacent pixel $q_1(-t)$ and the adjacent pixel $q_2(t)$ are respectively located at opposite sides of the current pixel p, and thus, the adjacent pixels $q_1(-t)$ and $q_2(t)$ are two spatial symmetrical pixels of the current pixel p.

In some embodiments, the calculation unit 1040 may select one of the weight products $W_m$ of the spatial symmetrical pixels to serve as the symmetrized weight $W_m'$ of each of the spatial symmetrical pixels. For instance, if it is assumed that the weight product $W_m$ of the adjacent pixel $q_1(-t)$ is $w(-t)$, and the weight product $W_m$ of the adjacent pixel $q_2(t)$ is $w(t)$, the calculation unit 1040 may select the minimum value from $w(t)$ and $w(-t)$ and serve the minimum value as the symmetrized weight $W_m'$ of each of the adjacent pixels $q_1(-t)$ and $q_2(t)$.

In other embodiments, the calculation unit 1040 may calculate an average of the weight products $W_m$ of the spatial symmetrical pixels to serve as the symmetrized weight $W_m'$ of each of the spatial symmetrical pixels. For instance, if it is assumed that the weight product $W_m$ of the adjacent pixel $q_1(-t)$ is $w(-t)$, and the weight product $W_m$ of the adjacent pixel $q_2(t)$ is $w(t)$, the calculation unit 1040 may calculate an average of $w(t)$ and $w(-t)$ and serve the average as the symmetrized weight $W_m'$ of each of the adjacent pixels $q_1(-t)$ and $q_2(t)$.

The calculation unit 1040 may calculate a weighted average of pixel values of the adjacent pixels by using the symmetrized weight $W_m'$ to obtain the smoothed signal $Y_{in}'$ of the current pixel p. For instance, the calculation unit 1040 may calculate equation (1) below to obtain the smoothed signal $Y_{in}'(p)$ of the current pixel p. In equation (1), $w(t)$ represents the symmetrized weight $W_m'$ of a $t^{th}$ adjacent pixel in the adjacent range L, and $Y_{in}(t)$ represents an intensity value (e.g., a luminance value) of the $t^{th}$ adjacent pixel.

$$Y_{in}'(p) = \frac{\sum_{t=-L/2}^{L/2} w(t) * Y_{in}(t)}{\sum_{t=-L/2}^{L/2} w(t)} \quad \text{Equation (1)}$$

Figure 12:
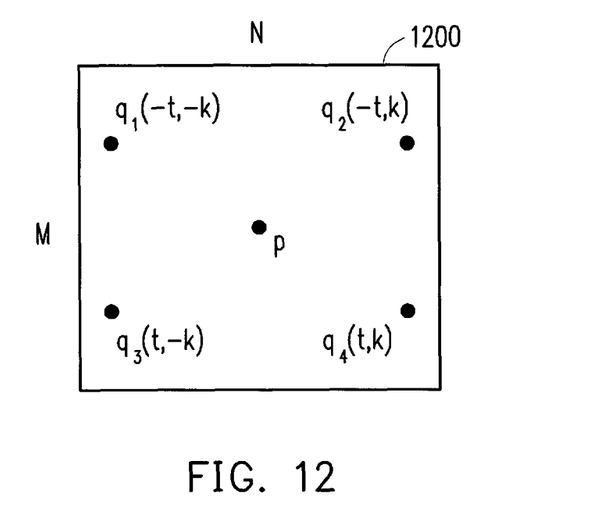
FIG. 12 is a schematic chart illustrating a scenario of symmetrizing the weight products $W_m$ of the adjacent pixels according to another embodiment of the invention.

FIG. 12 is a schematic chart illustrating a scenario where the calculation unit 1040 symmetrizes the weight products $W_m$ of the adjacent pixels depicted in FIG. 10 according to another embodiment of the invention. Referring to FIG. 10 and FIG. 12, the calculation unit 1040 may collect the weight products $W_m$ of different pixels provided by the third multiplier 1030 in one image frame. In FIG. 12, a pixel p represents the current pixel, and a range 1200 represents the adjacent range of the current pixel p. There is a plurality of adjacent pixels in the adjacent range 1200. In this case, if it is assumed that there are M*N adjacent pixels (where M and N are integers) in the adjacent range 1200, e.g., adjacent pixels $q_1(-t,-k)$, $q_2(-t,k)$, $q_3(t,-k)$ and $q_4(t,k)$ as shown in FIG. 12 or more pixels (which is not shown). The calculation unit 1040 may define the adjacent range 1200 by using the current pixel p as the center in a 2-D space, so as to select a plurality of spatial symmetrical pixels from the adjacent pixels in the adjacent range 1200. For instance, the calculation unit 1040 may select four spatial symmetrical pixels, e.g., adjacent pixels $q_1(-t,-k)$, $q_2(-t,k)$, $q_3(t,-k)$ and $q_4(t,k)$ from the adjacent pixels in the adjacent range 1200. A distance from the adjacent pixel $q_1(-t,-k)$ to the current pixel p is equal to a distance from the adjacent pixel $q_2(-t,k)$ to the current pixel p, a distance from the adjacent pixel $q_1(-t,-k)$ to the current pixel p is equal to a distance from the adjacent pixel $q_3(t,-k)$ to the current pixel p, a distance from the adjacent pixel $q_1(-t,-k)$ to the current pixel p is equal to a distance from the adjacent pixel $q_4(t,k)$ to the current pixel p, and thus, the adjacent pixels $q_1(-t,-k)$, $q_2(-t,k)$, $q_3(t,-k)$ and $q_4(t,k)$ are four spatial symmetrical pixels of the current pixel p.

In some embodiments, the calculation unit 1040 may select one of the weight products $W_m$ of the spatial symmetrical pixels to serve as the symmetrized weight $W_m'$ of each of the spatial symmetrical pixels. For instance, if it is assumed that the weight product $W_m$ of the adjacent pixel $q_1(-t,-k)$ is $w(-t,-k)$, the weight product $W_m$ of the adjacent pixel $q_2(-t,k)$ is $w(-t,k)$, the weight product $W_m$ of the adjacent pixel $q_3(t,-k)$ is $w(t,-k)$, and the weight product $W_m$ of the adjacent pixel $q_4(t,k)$ is $w(t,k)$, the calculation unit 1040 may select the minimum value from $w(-t,-k)$, $w(-t,k)$, $w(t,-k)$ and $w(t,k)$ and serve the minimum value as the symmetrized weight $W_m'$ of each of the adjacent pixels $q_1(-t,-k)$, $q_2(-t,k)$, $q_3(t,-k)$ and $q_4(t,k)$.

In other embodiments, the calculation unit 1040 may calculate an average of the weight products $W_m$ of the spatial symmetrical pixels to serve as the symmetrized weight $W_m'$ of each of the spatial symmetrical pixels. For instance, if it is assumed that the weight product $W_m$ of the adjacent pixel $q_1(-t,-k)$ is $w(-t,-k)$, the weight product $W_m$ of the adjacent pixel $q_2(-t,k)$ is $w(-t,k)$, the weight product $W_m$ of the adjacent pixel $q_3(t,-k)$ is $w(t,-k)$, and the weight product $W_m$ of the adjacent pixel $q_4(t,k)$ is $w(t,k)$, the calculation unit 1040 may calculate an average of $w(-t,-k)$, $w(-t,k)$, $w(t,-k)$ and $w(t,k)$ and serve the average as the symmetrized weight $W_m'$ of each of the adjacent pixels $q_2(-t,k)$, $q_3(t,-k)$ and $q_4(t,k)$.

The calculation unit 1040 may calculate a weighted average of pixel values of the adjacent pixels by using the symmetrized weight $W_m'$ to obtain the smoothed signal $Y_{in}'$ of the current pixel p. For instance, the calculation unit 1040 may calculate equation (2) below to obtain the smoothed signal $Y_{in}'(p)$ of the current pixel p. In equation (2), $w(t,k)$ represents the symmetrized weight $W_m'$ of an adjacent pixel arranged in the $t^{th}$ line and the $k^{th}$ column in the adjacent range 1200 (e.g., the adjacent pixel $q_4(t,k)$ or any other pixel in the adjacent range 1200), and $Y_{in}(t,k)$ represents an intensity value (e.g., a luminance value) of the adjacent pixel arranged in the $t^{th}$ line and the $k^{th}$ column.

$$Y_{in}'(p) = \frac{\sum_{t=-M/2}^{M/2}\sum_{k=-N/2}^{N/2} w(t,k) * Y_{in}(t,k)}{\sum_{t=-M/2}^{M/2}\sum_{k=-N/2}^{N/2} w(t,k)} \quad \text{Equation (2)}$$

Thus the image smooth circuit 121 may calculate a weighted average of the pixel values of the plurality of adjacent pixels by using the current pixel p as the center, so as to obtain the smoothed signal $Y_{in}'$ of the current pixel p.

It should be noted that in different embodiments, the function related to each of the spatial weight unit 1010, the range weight unit 1020, the third multiplier 1030 and the calculation unit 1040 may be implemented as software, firmware or hardware by using general programming languages (e.g., C or C++), hardware description languages (e.g., Verilog HDL or VHDL) or any other applicable programming languages. The software (or firmware) capable of executing the related functions may be deployed as any computer-accessible media, such as magnetic tapes, semiconductor memories, magnetic disks or compact disks (e.g., CD-ROMs or DVD-ROMs). Alternatively, the software (or firmware) capable of executing the related functions may be transmitted or delivered through the Internet, the wired communication, the wireless communication or any other communication medium. The software (or firmware) may be stored in a computer-accessible medium (e.g., a memory), such that a processor of the computer may access/execute the programming codes of the software (or firmware) to execute the related functions.

In light of the foregoing, the image processing apparatus and the image processing method provided by the embodiments of the invention can detect the flat pixel distribution of the image input signal. The false contour detection circuit can recognize the false contour in the image according to the flat pixel distribution, so as to correspondingly output the false contour coefficient to the false contour reduction circuit. The false contour reduction circuit can perform the false contour reduction image input signal according to the false contour coefficient, so as to prevent loss in the image details (e.g., the weak edges of fine textures).

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An image processing apparatus, comprising:
a false contour detection circuit, configured to detect a flat pixel distribution of an image input signal and correspondingly output a false contour coefficient; and
a false contour reduction circuit, coupled to the false contour detection circuit to receive the false contour coefficient, and performing false contour reduction on the image input signal according to the false contour coefficient, so as to correspondingly output an image output signal, wherein the false contour detection circuit comprises:
a flat pixel detection circuit, configured to determine whether each of a plurality of pixels of the image input signal is a flat pixel to output a flat pixel detection result;
a flat pixel distribution circuit, coupled to the flat pixel detection circuit to receive the flat pixel detection result, and configured to count a flat pixel number of the pixels which are determined as flat pixels within an adjacent range of a current pixel according to the flat pixel detection result; and
a conversion circuit, coupled to the flat pixel distribution circuit to receive the flat pixel number, and configured to convert the flat pixel number into the false contour coefficient of the current pixel.

2. The image processing apparatus according to claim 1, wherein the flat pixel detection circuit comprises:
a high-pass filter, configured to compare the current pixel with an adjacent pixel and output a comparison result; and
a flat pixel detector, coupled to the high-pass filter to receive the comparison result, and configured to determine whether the current pixel is a flat pixel according to the comparison result, so as to output the flat pixel detection result to the flat pixel distribution circuit.

3. The image processing apparatus according to claim 1, wherein the conversion circuit converts the flat pixel number into the false contour coefficient of the current pixel according to a non-linear curve.

4. The image processing apparatus according to claim 1, wherein the false contour coefficient is a real number between 0 and 1 and the false contour reduction circuit comprises:
an image smooth circuit, configured to smooth the image input signal and output a smoothed signal; and
a combiner, coupled to the image smooth circuit to receive the smoothed signal, configured to combine the smoothed signal and the image input signal according to the false contour coefficient to obtain the image output signal of the current pixel.

5. The image processing apparatus according to claim 4, wherein the combiner comprises:
a first multiplier, coupled to the image smooth circuit to receive the smoothed signal, coupled to the false contour detection circuit to receive the false contour coefficient, and configured to calculate $Y_1 = C_{fc} * Y_{in}'$ to output a first pixel value of the current pixel, wherein $Y_1$ represents the first pixel value, $C_{fc}$ represents the false contour coefficient of the current pixel, and $Y_{in}'$ represents the smoothed signal of the current pixel;
a second multiplier, coupled to the false contour detection circuit to receive the false contour coefficient, configured to calculate $Y_2 = (1 - C_{fc}) * Y_{in}$ to output a second pixel value of the current pixel, wherein $Y_2$ represents the second pixel value, $C_{fc}$ represents the false contour coefficient, and $Y_{in}$ represents the image input signal of the current pixel; and
an adder, coupled to the first multiplier and the second multiplier to receive the first pixel value and the second pixel value, configured to calculate $Y_{out} = Y_1 + Y_2$ to output the image output signal of the current pixel, wherein $Y_{out}$ represents the image output signal of the current pixel.

6. The image processing apparatus according to claim 4, wherein the image smooth circuit smooth the image input signal according to a spatial weight and a range weight and output the smoothed signal.

7. The image processing apparatus according to claim 6, wherein the image smooth circuit comprises:
a spatial weight unit, configured to define an adjacent range of the current pixel and determine the spatial weight of each of a plurality of adjacent pixels according to a spatial distance between the current pixel and each of the adjacent pixels within the adjacent range;
a range weight unit, configured to define a range window of the current pixel within the adjacent range and determine the range weight of each of the adjacent pixels according to a value of the current pixel and the range window;
a third multiplier, coupled to the spatial weight unit and the range weight unit to receive the spatial weight and the range weight, and configured to output a weight product of the spatial weight multiplying the range weight; and
a calculation unit, coupled to the third multiplier to receive the weight products of the adjacent pixels, and configured to symmetrize the weight products of the adjacent pixels by using the current pixel as the center to obtain symmetrized weights of the adjacent pixels and calculate a weighted average of pixel values of the adjacent pixels by using the symmetrized weights to obtain the smoothed signal of the current pixel.

8. An image processing method, adapted for an image processing apparatus, comprising:
detecting a flat pixel distribution of an image input signal to correspondingly generate a false contour coefficient; and
performing false contour reduction on the image input signal according to the false contour coefficient, so as to correspondingly output an image output signal,
wherein the step of detecting the flat pixel distribution of the image input signal comprises:
determining whether each of a plurality of pixels of the image input signal is a flat pixel, so as to generate a flat pixel detection result;
counting a flat pixel number of the pixels which are determined as flat pixels within an adjacent range of a current pixel according to the flat pixel detection result; and
converting the flat pixel number into the false contour coefficient of the current pixel.

9. The image processing method according to claim 8, wherein the step of determining whether each of the pixels of the image input signal is the flat pixel comprises:
  comparing the current pixel with an adjacent pixel, so as to generate a comparison result; and
  determining whether the current pixel is a flat pixel according to the comparison result, so as to generate the flat pixel detection result.

10. The image processing method according to claim 8, wherein the step of converting the flat pixel number into the false contour coefficient of the current pixel comprises:
  converting the flat pixel number into the false contour coefficient of the current pixel according to a non-linear curve.

11. The image processing method according to claim 8, wherein the false contour coefficient is a real number between 0 and 1, and the step of performing the false contour reduction on the image input signal comprises:
  smoothing the image input signal so as to generate a smoothed signal; and
  combining the smoothed signal and the image input signal according to the false contour coefficient to obtain the image output signal of the current pixel.

12. The image processing method according to claim 11, wherein the step of combining the smoothed signal and the image input signal comprises:
  calculating $Y_1 = C_{fc} * Y_{in}'$ to output a first pixel value of the current pixel, wherein $Y_1$ represents the first pixel value, $C_{fc}$ represents the false contour coefficient of the current pixel, and $Y_{in}'$ represents the smoothed signal of the current pixel;
  calculating $Y_2 = (1 - C_{fc}) * Y_{in}$ to output a second pixel value of the current pixel, wherein $Y_2$ represents the second pixel value, $C_{fc}$ represents the false contour coefficient, and $Y_{in}$ represents the image input signal of the current pixel; and
  calculating $Y_{out} = Y_1 + Y_2$ to output the image output signal of the current pixel, wherein $Y_{out}$ represents the image output signal of the current pixel.

13. The image processing method according to claim 11, wherein the step of smoothing the image input signal comprises:
  smoothing the image input signal according to a spatial weight and a range weight, so as to generate the smoothed signal.

14. The image processing method according to claim 13, wherein the step of smoothing the image input signal comprises:
  defining an adjacent range of the current pixel;
  determining the spatial weight of each of a plurality of adjacent pixels according to a spatial distance between the current pixel and each of the adjacent pixels within the adjacent range;
  defining a range window of the current pixel within the adjacent range;
  determining the range weight of each of the adjacent pixels according to a value of the current pixel and the range window;
  calculating a weight product of the spatial weight multiplying the range weight;
  symmetrizing the weight products of the adjacent pixels by using the current pixel as the center to obtain symmetrized weights of the adjacent pixels; and
  calculating a weighted average of pixel values of the adjacent pixels by using the symmetrized weights to obtain the smoothed signal of the current pixel.

15. An image processing apparatus, comprising:
  a false contour detection circuit, configured to detect a flat pixel distribution of an image input signal and correspondingly output a false contour coefficient; and
  a false contour reduction circuit, coupled to the false contour detection circuit to receive the false contour coefficient, and performing false contour reduction on the image input signal according to the false contour coefficient, so as to correspondingly output an image output signal, wherein the false contour detection circuit comprises:
  a plurality of flat pixel distribution channels, each configured to determine whether each of a plurality of pixels of the image input signal is a flat pixel along a corresponding direction among a plurality of directions and count a flat pixel number of the pixels which are determined as flat pixels within an adjacent range of a current pixel along the corresponding direction among the directions;
  a logic operation circuit, coupled to the flat pixel distribution channels to receive the flat pixel numbers on the directions, and configured to calculate a flat value of the current pixel by using at least one of the flat pixel numbers; and
  a conversion circuit, coupled to the logic operation circuit to receive the flat value, and configured to convert the flat value into the false contour coefficient of the current pixel.

16. The image processing apparatus according to claim 15, wherein one of the flat pixel distribution channels comprises:
  a flat pixel detection circuit, configured to determine whether each of the pixels of the image input signal is a flat pixel along the corresponding direction to output a flat pixel detection result; and
  a flat pixel distribution circuit, coupled to the flat pixel detection circuit to receive the flat pixel detection result, and configured to along the corresponding direction to count the flat pixel number of the pixels which are determined as the flat pixels within the adjacent range of the current pixel according to the flat pixel detection result.

17. An image processing method, adapted for an image processing apparatus, comprising:
  detecting a flat pixel distribution of an image input signal to correspondingly generate a false contour coefficient; and
  performing false contour reduction on the image input signal according to the false contour coefficient, so as to correspondingly output an image output signal,
  wherein the step of detecting the flat pixel distribution of the image input signal comprises:
    filtering noise from the image input signal so as to generate a pre-filtered signal;
    determining whether each of a plurality of pixels of the pre-filtered signal is a flat pixel so as to generate a flat pixel detection result;
    counting a flat pixel number of the pixels which are determined as flat pixels within an adjacent range of a current pixel according to the flat pixel detection result; and
    converting the flat pixel number into the false contour coefficient of the current pixel.

* * * * *